(12) United States Patent
Jablonski et al.

(10) Patent No.: US 9,126,127 B2
(45) Date of Patent: Sep. 8, 2015

(54) APPARATUS AND METHOD FOR SEPARATING HYDROPHILIC AND HYDROPHOBIC COMPONENTS

(75) Inventors: Erin Lynne Jablonski, Lewisburg, PA (US); Janet T. Tesfai, Cherry Hill, NJ (US); Renee N. Perry, Hoboken, NJ (US); Daniel Eric Mayo, Bordentown, NJ (US)

(73) Assignee: BUCKNELL UNIVERSITY, Lewisburg, PA (US)

( * ) Notice: Subject to any disclaimer, the term of this patent is extended or adjusted under 35 U.S.C. 154(b) by 773 days.

(21) Appl. No.: 13/479,838

(22) Filed: May 24, 2012

(65) Prior Publication Data

US 2012/0298579 A1 Nov. 29, 2012

Related U.S. Application Data

(60) Provisional application No. 61/519,518, filed on May 24, 2011.

(51) Int. Cl.
| | |
|---|---|
| *B01D 15/00* | (2006.01) |
| *G01N 15/06* | (2006.01) |
| *G01N 30/96* | (2006.01) |
| *B01D 17/02* | (2006.01) |
| *C02F 1/44* | (2006.01) |
| *B01D 17/04* | (2006.01) |

(52) U.S. Cl.
CPC .............. *B01D 17/0202* (2013.01); *C02F 1/44* (2013.01); *B01D 17/02* (2013.01); *B01D 17/04* (2013.01)

(58) Field of Classification Search
CPC ...... A61L 15/22; A61L 15/60; C08J 2300/14; E21B 33/0355; B01D 2257/504; B01D 17/0202; B01D 46/0036; C08F 220/06; B01J 20/267; B01J 2220/68; G01N 2291/0256; B01L 2300/0816; B01L 2200/027
USPC ........... 210/322, 708, 252, 511, 63, 335, 660, 210/689, 242.4, 264
See application file for complete search history.

(56) References Cited

U.S. PATENT DOCUMENTS

| | | | | |
|---|---|---|---|---|
| 3,002,325 | A  * | 10/1961 | Vogt ................................ | 53/527 |
| 7,063,041 | B2 * | 6/2006 | Odashiro ...................... | 116/217 |
| 7,390,463 | B2 * | 6/2008 | He et al. ........................ | 422/504 |
| 7,575,681 | B2 * | 8/2009 | Angelescu et al. ...... | 210/321.74 |
| 7,695,629 | B2 * | 4/2010 | Salamitou et al. ............ | 210/650 |
| 2001/0004062 | A1 * | 6/2001 | Rutledge et al. .............. | 210/315 |
| 2008/0158294 | A1 * | 7/2008 | Katoh ............................. | 347/36 |
| 2009/0065436 | A1 * | 3/2009 | Kalayci et al. ................ | 210/679 |
| 2011/0032513 | A1 * | 2/2011 | Joanicot et al. ................ | 356/51 |
| 2012/0298479 | A1 * | 11/2012 | Boyce et al. .................. | 198/311 |

* cited by examiner

*Primary Examiner* — Ana Fortuna
(74) *Attorney, Agent, or Firm* — Saul Ewing, LLP

(57) ABSTRACT

An apparatus for separating hydrophilic material from hydrophobic material, comprising: (a) a body having a first and second parallel walls defining an elongated cavity; (b) a water-absorbing material in the cavity along the first wall and having a surface essentially parallel to the second wall, thereby defining a channel between the surface and the second wall; (c) a first inlet having a first inlet end disposed in the channel, the first inlet being configured for injecting a mixture of hydrophilic and hydrophobic material; (d) a first outlet having a first outlet end disposed in the channel proximate the surface downstream of the first inlet end and configured for removing the hydrophilic material; and (e) a second outlet having a second outlet end disposed in the channel a distance from the surface downstream of the first inlet end and configured for removing the hydrophobic material.

34 Claims, 3 Drawing Sheets

APPARATUS AND METHOD FOR SEPARATING HYDROPHILIC AND HYDROPHOBIC COMPONENTS

REFERENCE TO RELATED APPLICATION

This application claims priority to U.S. Provisional Application No. 61/519,518, filed May 24, 2011, hereby incorporated by reference in its entirety.

FIELD OF INVENTION

The present disclosure relates generally to methods and apparatus for separating and/or analyzing fluids on a millifluidic scale, and, more particularly, to the formation and separation of emulsions, liquid/liquid extraction, and extraction and/or separation of molecules and particles.

BACKGROUND

Reliably separating fluids, such as water, oil, and gas, is critical in petroleum, medical, biological, and analytical chemistry applications, just to name a few. Separating fluids enables specific measurements to be performed on the particular fluid. For example, emulsion separation is necessary for the proper disposal of waste streams, purification in petroleum production, and the recovery of products from microreactors. Of particular interest in this application is the separation of emulsions, liquid/liquid extraction, and particle/molecule extraction and/or separation.

Conventional methods of emulsion separation involve, for example, addition of demulsifying agents, gravity separation, centrifugation, hydrocyclone separation, and air flotation. Aside from having high operating costs, these methods suffer from poor performance, often resulting in incomplete separation. Typically traces of contaminants remain in the fluid of interest. Additionally, conventional separation techniques often take a long time, depending on the particular composition of the fluid. For example, a fine emulsion may take months to separate by gravity.

Additionally, conventional emulsion separation methods usually involve large volumes, and tend not to be suitable for smaller scale separations. Current methods for small scale emulsion separation require the application of an external electrical signal as disclosed in HUNG ET AL., *A Microfluidic Platform for Manipulation and Separation of Oil-in-Water Emulsion Droplets using Optically Induced Dielectrophoresis*, JOURNAL OF MICROMECHANICS AND MICROENGINEERING. 20 (2010) 1; and FIDALGO ET AL., *From Microdroplets to Microfluidics: 3 Selective Emulsion Separation in Microfluidic Devices*, CHEM. INT. ED. 47, 2042-2045 (2008). Other methods employ the use of a pore comb structure as disclosed in ANGELSCU ET AL., *Microfluidic Capillary Separation and Real-Time Spectroscopic Analysis of Specific Components from Multiphase Mixtures*, ANALYTICAL CHEMISTRY, Vol. 82, No. 6 (2010).

Conventional methods of liquid-liquid extraction include bubble columns, requiring a significant density difference between the two liquid phases. Other methods of liquid-liquid extraction include microfluidic droplet-based extraction or electrochemically modulated extraction as disclosed in BERDUQUE ET AL., *Microfluidic Chip for Electrochemically-Modulated Liquid/Liquid Extraction of Ions*, ELECTROCCHEMISTRY COMMUNICATIONS, 10 (1), 20-24 (2008). Droplet-based extraction requires a separation method after extraction, and electrochemically modulated extraction requires the application of an external field.

Conventional methods of particle separation include filtration and centrifugation. However, filtration is often undesirable because of the potential of crushing particles and the inability to process large volumes of solution as particles collect. Centrifugation tends to be undesirable when there is a density difference within the particle, which happens, for example, when the particle is used to encapsulate another material. The harsh forces involved in centrifugation could cause the particle having different densities to rupture. Both filtration and centrifugation subject particles to undesirable shear stresses and/or suffer low particle yield.

More recently developed methods of particle separation use field-flow fractionation, dielectrophoresis and shear induced separation. Both field-flow fractionation and dielectrophoresis require the application of an external field, making those methods less desirable for transition to the industrial scale. Shear induced separation employs the use of a membrane making this method less desirable due to the potential for solids related damage or membrane fouling.

Both U.S. Pat. No. 7,695,629 to Salamitou et al and U.S. Pat. No. 7,575,681 to Angelescu et al. disclose the use of a separation and filtration device employing a porous membrane employing oleophobic pores for tangential flows there through for filtration. These devices employ complicated filtration mechanisms without channels and are on the micro as opposed to milliliter scale. U.S. Pat. No. 7,390,463 to He et al. discloses the use of an array of vertically oriented fluidic modules or micro-columns having fluidic microchannels, which serve as a conduit for introducing reagent or media solutions to the biological assay device for analysis. Again, this device is on the micro scale and is complex.

U.S. Published Patent Application No. 2011/0032513 to Joanicot et al. discloses both microfluidic and millifluidic flow channels. However, this device is exceeding complex, with intricate channels engraved on a plate, including an intricate array of feed channels, connector channels and even storage channels in the device.

Accordingly, there is a need for a microfluidic separator mechanism capable of emulsion separation, liquid/liquid extraction, and particle separation and/or extraction that does not require membranes, electrical fields, or additives, and may be manufactured simply and economically. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides an apparatus and method for separating the hydrophilic and hydrophobic components of a mixture. (As used herein, the term "hydrophobic" includes hydrophobic and amphiphilic materials.) Specifically, the present invention uses a water-absorbing material along one side of a channel in the apparatus. When the mixture comprising hydrophilic and hydrophobic components is injected into the apparatus, the hydrophilic components (e.g. aqueous plugs or droplets or hydrophilic particles) are drawn to the aqueous layer, which flows adjacent to the water-absorbing material, while the hydrophobic components (e.g., oil or organic solvent) flows in its own phase. The high interfacial tension between the hydrophilic and hydrophobic phases causes the two streams to strive to minimize their contact area. The dynamics of this minimization results in a stable, pinned interface between the two streams down the channel. Furthermore, because water has high surface tension and the cohesive force between water molecules is very strong, the hydrophilic components are "pulled" into the aqueous layer flowing next to the water-absorbing material.

The apparatus of the present invention is able to separate a variety of hydrophobic/hydrophilic mixtures. For example, it can separate hydrogel capsules containing glass beads, live mammalian cells, oil-in-water emulsions, water-in-oil emulsions, and amphiphilic molecules. The use of this device for the separation of larger molecules or particles (e.g., hydrogel capsules) is of particular significance because other devices that currently achieve parallel flow of immiscible fluids use membranes or function at such small scales that they are not feasible for separation of larger molecules or particles as mentioned above.

Among other benefits, the apparatus of the present invention operates at the milli-scale level. Milli-scale devices exhibit the fluid properties available at the microfluidic level such as mixing by diffusion, laminar flow, and easily controlled heat transfer. However, unlike microfluidic devices, milli-scale devices are able to process larger volumes of fluid while also decreasing the likelihood of solids related damage. In other words, milli-scale devices are able to retain the advantages of operating at such a small scale while exhibiting the benefits of operating at a slightly larger scale. This novel method occurs on a small scale in one embodiment, making it desirable for low volume, high value materials processing such as biomolecule extraction, particle separation, or pharmaceutical purification. These small-scale devices can readily be scaled up by running platforms of milli-fluidic devices in parallel to process larger volumes of liquids.

This extraction technique also serves as a reliable method for determining mass transfer coefficients due to the well defined interface between the two immiscible fluids.

Accordingly, one aspect of the invention is an apparatus having a separation channel with a water-absorbing layer along one side of the channel. In one embodiment, the apparatus comprises: (a) at least one body having at least first and second two parallel walls defining an elongated cavity; (b) a water-absorbing material in the cavity along the first wall and having a surface essentially parallel to the second wall, thereby defining a channel between the surface and the second wall, the channel having an upstream and downstream orientation; (c) a first inlet having a first inlet end disposed in the channel at a certain distance from the surface and at a certain angle to the surface, the first inlet being configured for injecting a mixture of hydrophilic and hydrophobic material; (d) a first outlet having a first outlet end disposed in the channel proximate the surface downstream of the first inlet end and configured for removing the hydrophilic material; and (e) at least a second outlet having a second outlet end disposed in the channel a distance from the surface downstream of the first inlet end and configured for removing the hydrophobic material.

Another aspect of the invention is a method for separating hydrophobic and hydrophilic components using the apparatus described above. In one embodiment, the method comprises: (a) injecting a mixture of hydrophilic and hydrophobic material through a first inlet having a first inlet end disposed in the channel a distance from the surface, resulting in an interface between the hydrophilic material and the hydrophobic material; (b) removing the hydrophilic material through a first outlet having a first outlet end disposed in the channel proximate the surface downstream of the first inlet end; and (c) removing the hydrophobic material through a second outlet having a second outlet end disposed in the channel proximate the second wall.

DETAILED DESCRIPTION

Figure 1:
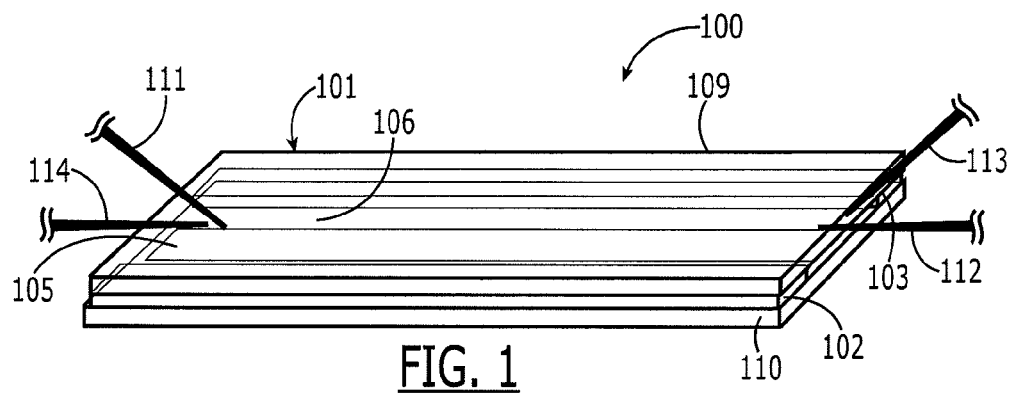
FIG. 1 is a perspective view of one embodiment of the separation apparatus of the present invention.
Figure 2:
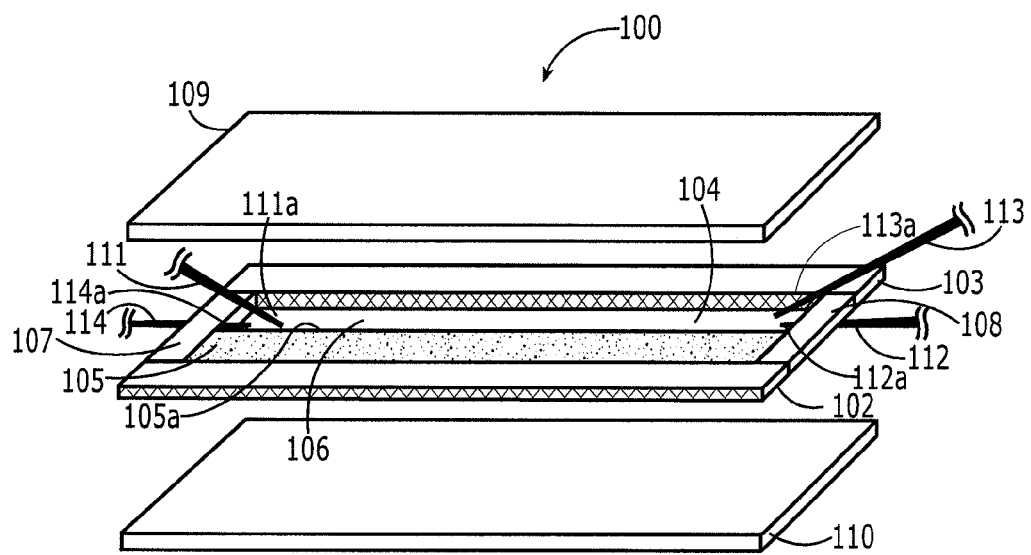
FIG. 2 is an exploded view of the separation apparatus of FIG. 1.
Figure 3:
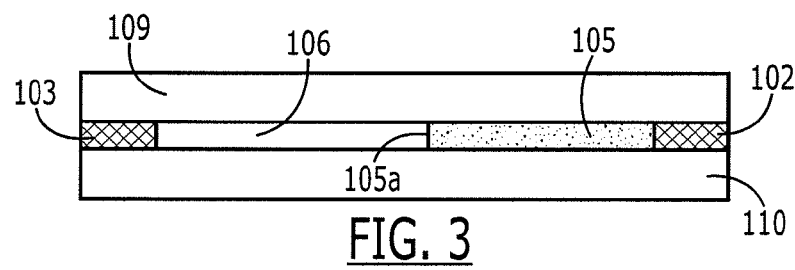
FIG. 3 is a cross sectional view of the separation apparatus of FIG. 1.

Referring to FIGS. 1-3, one embodiment of the apparatus 100 for separating hydrophilic material from hydrophobic material according to the present invention is shown. The apparatus 100 comprises at least one body 101 having at least first and second parallel walls 102, 103 defining an elongated cavity 104. Along the first wall 102 is a water-absorbing material 105 having a surface 105a essentially parallel to the second wall 103, thereby defining a channel 106 between the surface 105a and the second wall 103. The channel 106 has an upstream (left as shown) and downstream (right as shown) orientation. Disposed upstream in the channel 106 is a first inlet 111 having a first inlet end 111a disposed in the channel 106 at a certain distance d (see, e.g., FIG. 4) from the surface 105a. The first inlet 111 is configured to inject a mixture of hydrophilic and hydrophobic material into the channel. Downstream of the first inlet 111 is a first outlet 112 having a first outlet end 112a disposed in the channel 106 proximate the surface 105a and configured for removing the hydrophilic material. Also downstream of the first inlet 111 is at least a second outlet 113 having a second outlet end 113a disposed in the channel 106 proximate the second wall 103 and being configured to remove the hydrophobic material. In one embodiment, the apparatus 100 also comprises a second inlet 114 having a second inlet end 114a disposed in the channel 106 upstream of the first inlet end 111a for introducing aqueous material into the channel 106.

The apparatus 100 facilitates separation between hydrophilic material and hydrophobic material. In one embodiment, the separation process comprises: (a) injecting a mixture of hydrophilic and hydrophobic material through the first inlet 111, resulting in an interface (not shown) in the channel 106 between the hydrophilic material and the hydrophobic material as the mixture flows down the channel 106; (b) removing the hydrophilic material through the first outlet 112; and (c) removing the hydrophobic material through the second outlet 113.

Each of these elements and examples of alternative embodiments are described in greater detail below.

A key element of the invention is the water-absorbing material 105 which functions to draw water from the channel, creating an aqueous flow at its surface and thereby producing a stable interface between the co-laminar flows of hydrophobic and hydrophilic material. Specifically, when a hydrophobic/hydrophilic mixture is injected into the apparatus 100, the hydrophilic material (e.g. aqueous plugs or droplets) are drawn to the aqueous layer which flows adjacent to the water-absorbing material 105. The aqueous material may be present in the mixture or it may be injected from the second input 114 as described above. The hydrophobic material (e.g., oil or organic solvent) leaves the first inlet tip 111a of the first input 111 and becomes its own phase. There is a high interfacial tension between the hydrophilic and hydrophobic phases, and consequently the two phases strive to minimize their contact area. The dynamics of this minimization results in a stable, pinned interface between the two phases as they flow down the channel 106. Water has a very high surface tension and the cohesive force between water molecules is very strong, which is why the aqueous droplets are "pulled" into the aqueous stream next to the water-absorbing material 105.

The apparatus of the present invention is able to separate a variety of hydrophobic/hydrophilic mixtures. As used herein, the term "hydrophobic" includes hydrophobic and amphiphilic materials. For example, it can separate hydrogel capsules containing glass beads, live mammalian cells, oil-in-water emulsions, water-in-oil emulsions, and amphiphilic molecules. The use of this device for the separation of larger molecules or particles (e.g., hydrogel capsules) is of particular significance because other devices that currently achieve parallel flow of immiscible fluids use membranes or function at such small scales that they are not feasible for separation of larger molecules or particles as mentioned above.

The body 101 functions to define the cavity in which the water-absorbing material is disposed and to define the channel 106 in the body. In one embodiment, the body 101 comprises first and second walls 102, 103 as shown. Generally, although not necessarily, the walls are parallel. Depending on the configuration, the body 101 may also comprise end walls 107, 108 as shown. In one embodiment, the body 101 comprises top and bottom substrates 109, 110 which are spaced apart by the walls 102, 103, 107, 108 as shown in FIG. 2.

As discussed below in greater detail, the body and walls may be manufactured using known techniques. In one embodiment, the walls comprise cured adhesive, which not only forms the walls, but also adheres the top and bottom substrates 109, 110 together. Alternatively, the walls may be discrete components that are secured in place. Still other embodiments will be obvious to those of skill in the art in light of this disclosure.

As mentioned above, the water-absorbing material 105 is a key element of the present invention as it functions to draw water from the channel to create an aqueous stream adjacent its surface 105a, thereby producing a stable interface between the co-laminar flows of hydrophobic and hydrophilic material as described above. The water-absorbing material may be any known hydrophilic material including, for example, hydrophilic gels, polymers, and surface modifying agents. In one embodiment, the water-absorbing material is a hydrogel. Suitable hydrogels include, for example, poly(ethylene glycol).

The water-absorbing material may be configured in different ways, although generally, but not necessarily, it will be configured as a rectilinear layer along the first wall 102 such that it presents a surface 105a which is essentially parallel to the second wall 103 to define a channel between the surface 105a and the second wall 103. The relationship between the dimensions of the channel and the volume of the water-absorbing material, and between the dimensions of the channel and the surface 105a tend to be important to ensure effective operation. Generally, there must be a sufficient volume of water-absorbing material to stabilize the aqueous flow. Additionally, the area of the surface 105a relative to the volume of the channel must be large enough to stabilize a pinned interface (i.e., the interface should be sufficiently flat such that unstable interfacial curvature and thus the formation of secondary droplets is prevented). Although the relative volume of the channel and water-absorbent material can vary, in one embodiment, the ratio of channel volume to water-absorbent material volume is about 1:2 to about 2:1, and in a more particular embodiment is about 1:1.5 to about 1.5:1, and in yet a more particular embodiment about 1:1. Optimizing a particular ratio depends on a number of other variables, including the interfacial tension between the two fluid phases, viscosity of the fluids, hydrophilic attraction of the material, flow rate, volume of aqueous material in the flow, length of channel, width of channel relative to volume, and solids loading.

The inlet(s) and outlets function to introduce and extract fluids from the channel 106. The inlets and outlets may be any conduit suitable for conveying fluids. Examples of inlets and outlets include glass tubes, metal syringes, and even channels defined in the walls of the body 101. In one embodiment, the inlet and outlets are syringes. Examples of syringes include 21 or 25 gauge blunt needles. In one embodiment, the inlets and outlets are combined with other devices, such as, for example, valves and/or pumps, to facilitate injection into and extraction from the channel. In this respect, the injection and extraction may be passive, or it may be pressurized in connection with the inlets and/or negatively pressurized with respect to the outlets.

The configuration and placement of the inlets and outlets is an important variable in the operation of the apparatus 100. Generally, the first inlet end 111a should be spaced away from the surface 105a for liquid/liquid extraction. Conversely, the first inlet end 111a should be proximate the surface 105a for emulsion separation and hydrophilic particle extraction. Accordingly, in one embodiment, the first inlet end 111a is adjustable. Alternatively, the separation application of the apparatus 100 may be predetermined, in which case the first inlet end 111a may be fixed.

Figure 4:
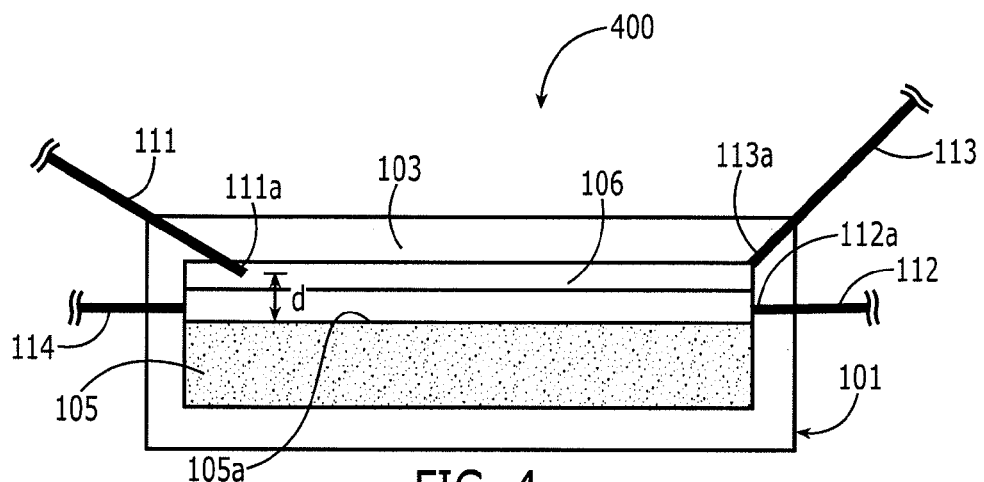
FIG. 4 is a cross sectional schematic diagram of one embodiment of the separation apparatus for liquid-liquid extraction.

Referring to FIG. 4, an embodiment of the apparatus 400 is shown which is configured for microfluidic liquid-liquid extraction (LLE). Specifically, the first inlet end 111a is retracted to be a relatively large distance d from the surface 105a, and, in this embodiment, is retracted to essentially the surface of the second wall 103. The first inlet 111 is configured to inject an organic (or emulsion or particle-laden) through the first inlet end 111a. Optionally, a second inlet 114 is configured to inject an aqueous stream through the second inlet end 114a. Such an injection is generally preferred in applications in which the amount of aqueous material being injected by the inlet 111 is insufficient to cause an aqueous stream to flow adjacent the surface 105a such that the interface between the co-laminar streams is within the channel and not along the surface 105a. If the amount of aqueous material in the hydrophobic/hydrophilic mixture being injection by first inlet 111 is sufficient to create the aqueous stream mentioned above, then no addition water needs to be injected through the second inlet 114. In some embodiments, the second inlet end 114a may be trimmed to a length to avoid the second inlet end 114a from entering the channel 106.

Once the mixture enters the apparatus 400, a stable co-current laminar flow is achieved, resulting in a stable pinned interface. Based on the concentration gradient between the two immiscible phases or a solubility (or activity, thermodynamically) preference, the solute diffuses across the pinned interface resulting in liquid-liquid extraction.

Figure 5:
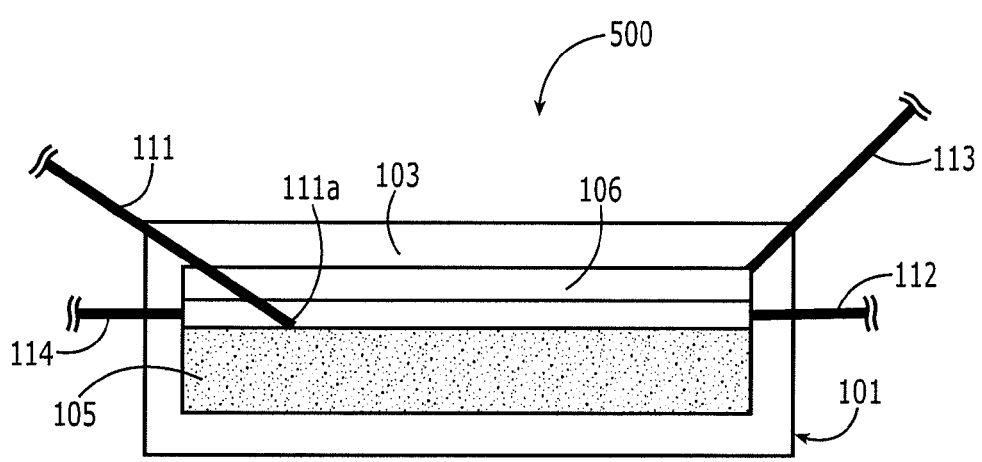
FIG. 5 is a cross sectional schematic diagram of one embodiment of the separation apparatus for emulsion separation.

Referring to FIG. 5, an embodiment is shown in which the apparatus 500 is configured for emulsion separation or hydrophilic particle separation applications. In this embodiment, the first inlet end 111a is located at the surface 105a as shown. The distance d in this embodiment is so small that it is not represented in the figure. In one embodiment, distance d is less than 500 microns, and, in a more particular embodiment, is less than 100 microns. In one embodiment, if the mixture comprises an emulsion having a hydrophilic droplet or an encapsulated cell, the distance d of the first inlet end to the surface 105a is less than the size of the hydrophilic droplet or the encapsulated cell. In this embodiment, the location of this first inlet end 111a allows for the deformation of the droplet/hydrophilic particle allowing for the disruption of a boundary layer surrounding each droplet/particle. Once the boundary layer has been shed, the droplet/particle is able to migrate to its respective component phase based on hydrophilic or hydrophobic attractions. As mentioned above, in one embodiment, a continuous aqueous stream is fed to the apparatus 100 through a second inlet 114 to facilitate transport of the aqueous phase of the emulsion and/or hydrophilic particle. Separation of the two phases is maintained throughout the length of the channel 120 by virtue of the stable, pinned interface between the two immiscible phases. Specifically, the water-absorbing material stabilizes the separation of immiscible hydrophobic and hydrophilic phases along the length of the channel 106 as mentioned above. Stable co-current laminar flow along the length of the channel 106 allows for highly effective separation of the two component phases at the second and second outlets 112, 113.

Figure 6:
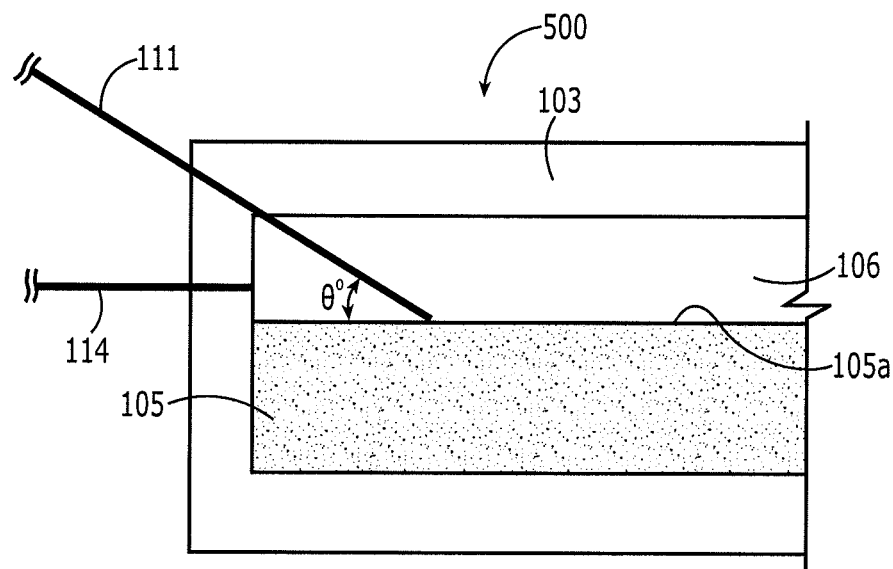
FIG. 6 is a schematic diagram of the tip of the first inlet according to one embodiment of the present invention.

The angle of the tip 111a to the surface 105 can affect the performance in emulsion separation and hydrophilic particle separation applications because of the resultant shear force needed to deform a droplet or disrupt the boundary layer on a particle. Specifically, referring to FIG. 6, in one embodiment, the angle θ of the tip 111a of the first inlet 111 with respect to the surface 105a of the water-absorbing material 105 is about 10 to about 170 degrees. In a more particular embodiment, the angle is about 10 to about 60 degrees. This has been found to provide for good flow rates (e.g., 2.5 ml/hr) with a ratio of 10:4 of aqueous to oil. Modifications to this angle allow optimization for fluid systems with immiscible phases of varying interfacial tensions and relative viscosities.

Figure 7:
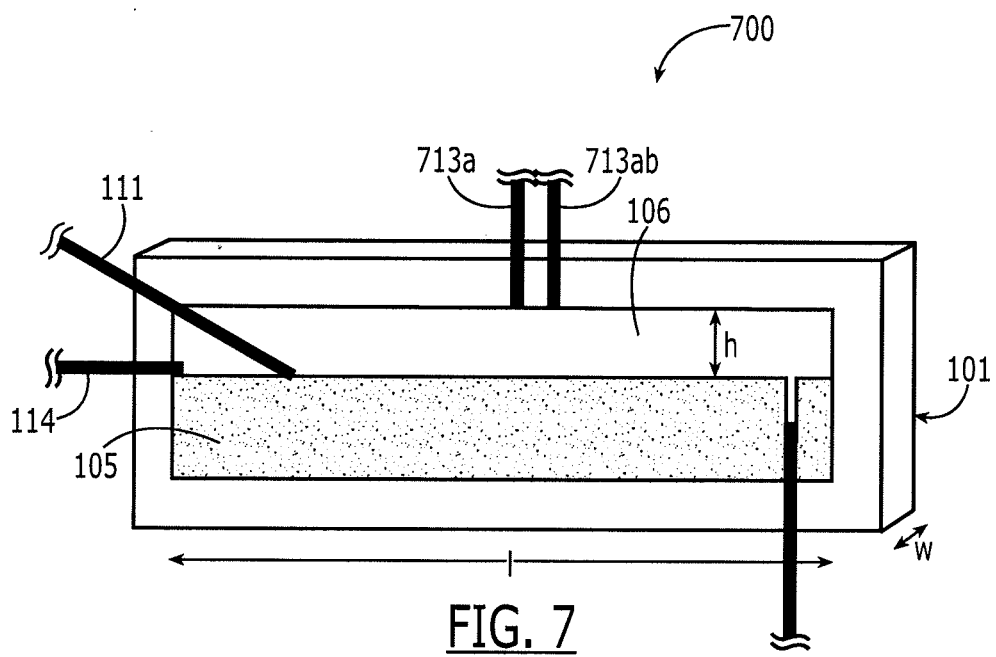
FIG. 7 is cross sectional schematic diagram of an alternative embodiment of the separation device of the present invention.

The first outlet 112 is configured to remove the hydrophilic material while the second outlet 113 is configured to remove the hydrophobic material. The second and second outlets may be configured in different ways. In one embodiment, the tip 112a of the first outlet is just above the surface 105a as shown in FIGS. 4 and 5. In another embodiment, the tip 112a of the first outlet is recessed in the water-absorbing material 105a below the surface 105a as shown in FIG. 7. In the embodiment shown in FIGS. 4 and 5, the second and second outlets 112, 113 are about the same distance downstream from the first inlet 111. Alternatively, the second outlet 113 may be disposed upstream of the first outlet 112. For example, referring to FIG. 7, the second outlet 113 is disposed essentially between the first and first outlet ends. Also, in the embodiment shown in FIG. 7, the second outlet 113 comprises a plurality of outlets 713a, 713b. By using a plurality of second outlets 113 and increasing the distance between the second outlet(s) 113 and first outlet 112, the chance for contamination of the hydrophilic steam with hydrophobic stream is reduced, thereby increasing efficiency and allowing higher flow rates to be realized. Adjustment of outlets also allows for optimization of systems with widely varying viscosities.

As mentioned above, the stable, pinned interface is facilitated by the relationship of the channel 106 to the water-absorbing material 105, which can vary in configuration. In particular, the channel 106 may have relatively small dimensions (e.g. 0.6 mm×3 mm×50 mm (width×height×length)), or larger dimensions (e.g., 2.4 mm×11 mm×50 mm). Still larger dimensions are possible providing that the water-absorbing layer 105 and surface 105a are sized appropriately as described above. In this respect, the geometry of the channel 106 may be altered to increase the relative amount of interfacial area to volume, allowing for greater extraction per volume of solution transported to the apparatus 100. As mentioned above, the interaction of the interfacial area and volume is highly dependent on the relative viscosities and interfacial tension. The greater the interfacial tension between the two phases, the larger the interfacial area can be such that the colaminar flow is still favored over plug flow. Also, the more viscous the fluids the more stable the streamlines, and thus the greater the interfacial area could be per overall volume of solution.

The length of the channel is dictated by the need to maintain co-laminar flow. As a practical matter, the length limit is dictated by the transition between stable colaminar flow and the formation of an emulsion (droplets or plug flow). This emulsion would be formed because instabilities or perturbations in the flow would lead to sufficiently increased interfacial curvature to result in droplet break-up. Perturbations could be caused by anything from defects in the device to varying particle sizes being recovered in the aqueous phase. Accordingly, the length is less than that at which instabilities and subsequent droplet break-up occurs. An unexpected property of the apparatus 100 is that the water-absorbing material may increase the theoretical length of the channel before instability occurs. In one embodiment, the channel is about 30 to about 75 mm long, although significantly longer lengths are well within the scope of the invention.

In the embodiments disclosed herein in FIGS. 1-7, the channel is a single channel having a rectangular cross section as defined in a single body 101 (see FIG. 3). It should be understood, however, that alternative configurations exist. For example, in one embodiment, the apparatus comprises multiple body portions configured such that the respective channels defined by the body portions are connected in series, thereby effectively increasing the length of the channel 106 and thus allowing for a higher degree of extraction to occur. Alternatively, in one embodiment, the apparatus comprises multiple body portions configured such that the respective channels defined by the body portions are connected in parallel, thereby increasing the throughput. In yet another embodiment, the apparatus is combined with a droplet-based microfluidic extraction. Specifically, traditional liquid-liquid extraction is typically performed in droplet-based systems in which a T-junction device is used to create droplets of one phase in the other to have a solute-loaded liquid in contact with the liquid that extracts the solute. The two phases (one continuous, one droplet) are passively recovered by separation in the colaminar flow device. The benefit of this configuration is that the time of contact can be increased readily by simply making the conduit between the T-junction device and the colaminar flow separation device as long as needed.

The configuration of the channel 106, surface 105a, water-absorbing material 105, and mixture of materials, among other factors, dictates the flow rate. Generally, higher flow rates are preferred. However, when the combined flow rates are too high, the interface between the hydrophilic and hydrophobic phases starts to destabilize and the outlet separation efficiency is reduced (e.g., more hydrophobic material is extracted in the first outlet, and more water is extracted in the second outlet 113). For example, flow rates for the configurations of FIGS. 1-6 tend to be in the range of 1 to 100 ml/hr. However, increased rates can be achieved through different outlet configurations and other optimizations. For example, higher flow rates can be achieved by increasing the number of second outlets 113 as described above with respect to FIG. 7. The apparatus 700 of this alternate embodiment separates emulsions with greater efficiency, e.g., greater than 80%. In one particular embodiment, the apparatus has an emulsion flow rate of about 2 ml/h to about 180 ml/h for a channel 106 having a width of about 1.2 mm to about 1.8 mm, a height of about 3 mm to about 10 mm, and a length of about 50 mm.

The apparatus 100 may be manufactured using known techniques. In one embodiment, the apparatus 100 is manufactured using a photolithographic method, which allows for alterations in channel size by changes in photomask geometry. For example, in one embodiment, substrates 109 and 110 were planar glass slides, which were cleaned with acetone, isopropyl alcohol, and oxygen plasma. Next, Norland Optical Adhesive (NOA) was applied between two glass slides and separated by silicon spacers that were 1.2 mm in height. A photomask was placed over the glass slides to define the first and second walls 102, 103 and end walls 107, and then the glass slides were exposed to UV light at an intensity of 1100 µW/cm2 for 14 min. After UV curing, the spacers were removed and the optical adhesive wall was cleaned with pressurized air, acetone, and ethanol. Needles, 21 G and 30 G in size, were inserted into optical adhesive to define inlets and outlets of the device, respectively. The device was then baked in a 50° C. oven for 12 h. After baking, the glass slides were exposed to a solution of 1 mM TPM in hexane for 25 min for deposition of a complete self assembled monolayer. A photomask was applied to define the boundaries of the water-absorbing material 105. A hydrogel solution of 40% water by volume, 60% PEG-DA by volume, and 0.25% Irgacure 2959 by mass was injected into the cavity 104, and the entire assembly was exposed to UV light at an intensity of 1100 µW/cm2 (units) for 14 min to form the water-absorbing material and define the surface 105a. After UV curing, the channel 106 was cleared with deionized water.

In an alternative embodiment, the substrates 109, 110 are separated by silicon spacers, which are reduced in height, for example, 0.6 mm in height. Due to the approximate 50% reduction in height and a corresponding reduction in optical adhesive volume, the time the optical adhesive and hydrogel are exposed to UV light are reduced to 7 minutes at an intensity of 1100 µW/cm2. Due to the decrease in channel size, the 21 G needles which serve as inlet means 111, 114 and outlet means 112, 113 to the apparatus 400 (see FIG. 4) need to be flattened to fit between the two glass slides.

It should be understood that the description above provides illustrative embodiments of the present invention and other embodiments exist.

What is claimed is:

1. An apparatus for separating hydrophilic material from hydrophobic material, said apparatus comprising:
   at least one body having at least first and second two parallel walls defining an elongated cavity;
   a water-absorbing material in said cavity along said first wall and having a surface essentially parallel to said second wall, thereby defining a channel between said surface and said second wall, said channel having an upstream and downstream orientation;
   a first inlet having a first inlet end disposed in said channel at a certain distance from said surface and at a certain angle to said surface, said first inlet being configured for injecting a mixture of hydrophilic and hydrophobic material;
   a first outlet having a first outlet end disposed in said channel proximate said surface downstream of said first inlet end and configured for removing said hydrophilic material; and
   at least a second outlet having a second outlet end disposed in said channel a distance from said surface downstream of said first inlet end and configured for removing said hydrophobic material.

2. The apparatus of claim 1, further comprising:
   a second inlet having a second inlet end disposed proximate said surface and upstream of said first inlet end and configured for injecting an aqueous solution.

3. The apparatus of claim 1, wherein said first inlet is adjustable to alter said distance.

4. The apparatus of claim 1, wherein said first inlet end is disposed proximate said second wall.

5. The apparatus of claim 1, wherein said first inlet end is disposed proximate said surface.

6. The apparatus of claim 5, wherein said distance is less than 500 microns.

7. The apparatus of claim 6, wherein said distance is less than 100 microns.

8. The apparatus of claim 5, wherein said certain angle is about 10 to about 170 degrees.

9. The apparatus of claim 8, wherein said certain angle is about 10 to about 60 degrees.

10. The apparatus of claim 1, wherein said first outlet end is recessed in said water-absorbing material below said surface.

11. The apparatus of claim 1, wherein said second outlet end is disposed upstream of said first outlet.

12. The apparatus of claim 11, wherein said second outlet end is disposed essentially between said first and first outlet ends.

13. The apparatus of claim 1, wherein said second outlet comprises a plurality of inlets and outlets.

14. The apparatus of claim 1, wherein said inlets and outlets are syringes.

15. The apparatus of claim 1, wherein said inlets and outlets are glass inlets and outlets.

16. The apparatus of claim 1, wherein said water-absorbing material is a hydrogel.

17. The apparatus of claim 16, wherein said hydrogel is poly(ethylene glycol).

18. The apparatus of claim 1, wherein said apparatus comprises multiple body portions configured such that the respective channels defined by said body portions are connected in series.

19. The apparatus of claim 1, wherein said apparatus comprises multiple body portions configured such that the respective channels defined by said body portions are connected in parallel.

20. The apparatus of claim 1, wherein said body comprises top and bottom substrates which are spaced apart by said walls.

21. The apparatus of claim 20, wherein said walls are cured adhesive holding the top and bottom substrates together.

22. The apparatus of claim 1, wherein said channel is about 30 to about 75 mm long.

23. The apparatus of claim 1, wherein said channel has a rectangular cross section.

24. The apparatus of claim 1, wherein said first and second inlet inlets and outlets are pressurized to inject said mixture and said aqueous material into said channel.

25. A process of separating hydrophilic material from hydrophobic material using an apparatus comprising a body having at least first and second two parallel walls defining an elongated cavity, a water-absorbing material in said cavity along said first wall, thereby defining a channel between a surface of said water-absorbing material and said second wall, said channel having an upstream and downstream orientation, said process comprising:

(a) injecting a mixture of hydrophilic and hydrophobic material through a first inlet having a first inlet end disposed in said channel a distance from said surface, resulting in an interface between said hydrophilic material and said hydrophobic material;

(b) removing said hydrophilic material through a first outlet having a first outlet end disposed in said channel proximate said surface downstream of said first inlet end; and (c) removing said hydrophobic material through a second outlet having a second outlet end disposed in said channel proximate said second wall.

26. The process of claim 25, wherein said hydrophilic material is selected from an encapsulated cell, hydrophilic droplet, or a hydrophilic liquid.

27. The process of claim 26, wherein said hydrophilic material is a hydrophilic liquid and said mixture comprises a sufficient volume of water to maintain said interface away from said surface.

28. The process of claim 26, wherein said mixture comprises an emulsion having said hydrophilic droplet or said hydrophilic capsule or particle, and said distance of said first inlet end to said surface is less than the size of said hydrophilic droplet or said encapsulated cell, hydrophilic capsule or particle.

29. The process of claim 25, wherein said hydrophobic material is an organic carrier liquid.

30. The process of claim 25, further comprising:

(d) injecting an aqueous material from a second inlet having a second inlet end disposed in said channel proximate said surface and upstream of said first inlet end, said aqueous material being injected at a volume to maintain said interface away from said surface.

31. The process of claim 25, wherein said flow rate is about 1 ml/h to about 180 ml/h.

32. The process of claim 25, wherein said channel has a length which is less than the distance at which interfacial instability occurs.

33. The process of claim 32, wherein said water-absorbing material is essential for maintaining interfacial stability over the length of the device.

34. The process of claim 25, wherein said at least second outlet comprises a plurality of inlets and outlets to reduce pressure in said channel downstream of said first inlet to maintain said interface in a flat state.

* * * * *